W. F. NEWCOMBE.
Wheelbarrow.
No. 78,003.
Patented May 19, 1868.
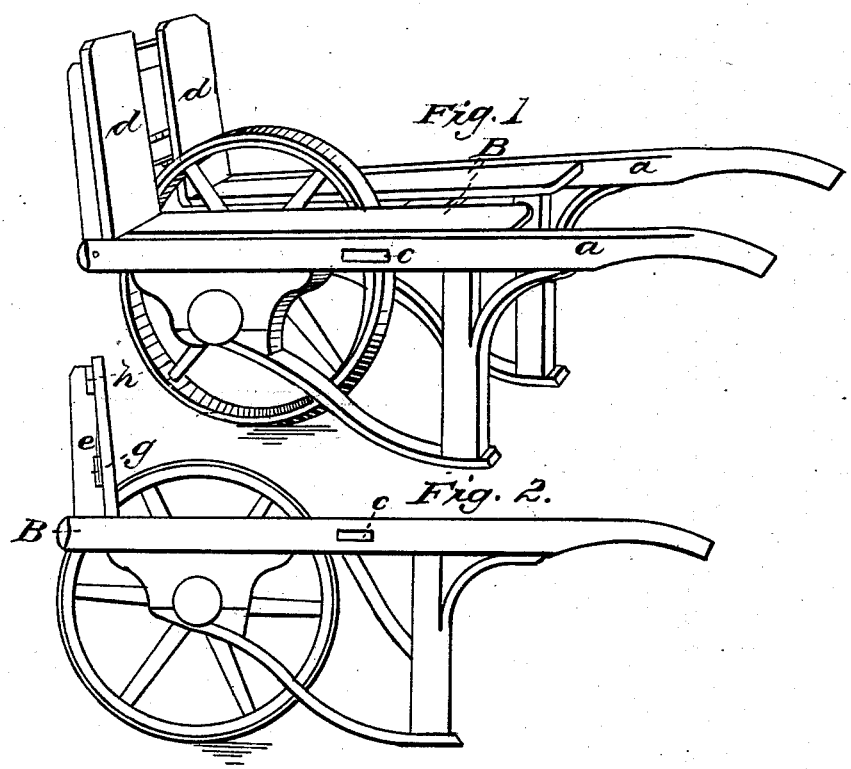
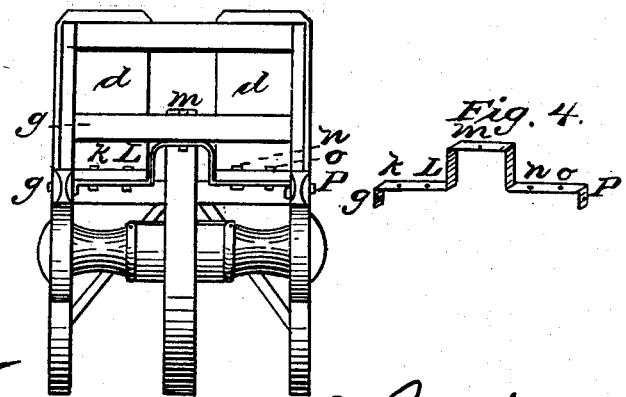
WITNESSES
Henry Thomas
William
INVENTOR
William F. Newcombe

United States Patent Office.

WILLIAM F. NEWCOMBE, OF CLEVELAND, OHIO.

Letters Patent No. 78,003, dated May 19, 1868.

IMPROVEMENT IN WHEEL-BARROW.

The Schedule referred to in these Letters Patent and making part of the same.

TO ALL WHOM IT MAY CONCERN:

Be it known that I, WILLIAM F. NEWCOMBE, of Cleveland, county of Cuyahoga, in the State of Ohio, have invented a new and improved Mode of Constructing Wheel-Barrows for wheeling bricks, &c.; and I do hereby declare that the following is a full and exact description thereof, reference being had to the accompanying drawings, and to the letters of reference marked thereon.

The nature of my invention consists in applying an iron arch or bridge over and down each side of the wheel-barrow-wheel to the bottom, and under it to the side-pieces, and there fastened, which supports the bottom and strengthens the whole front part of the barrow, and enables me to set the wheel at or near the centre of the load.

To enable others skilled in the art to use my invention, I herein describe the construction and operation.

I make the main part of the wheel-barrow as usually made, but to enable me to get the wheel back near the centre of the load, I make a space in the bottom, and part way up the front end, for the wheel to run in, leaving room for a tier of bricks on each side of the wheel, and to support the bottom, instead of putting a cross-bar under the front end, which would have to be cut away to admit the wheel, leaving the front end of the bottom without support. I make an iron bridge or arch, as shown in Figure 4, the arch, $m$, being bolted to the cross-bar $g$, as shown in Figure 3, and running down each side of the wheel, and under the bottom to the sides at $g$, and there fastened, thus supporting the bottom, and strengthening the whole front part of the wheel-barrow.

What I claim as my invention, and desire to secure by Letters Patent, is—

The application of the iron bridge, to strengthen the front part of a wheel-barrow, substantially as shown and described.

W. F. NEWCOMBE.

Witnesses:
PIERRE A. GOLLIER,
R. A. DAVIDSON.